Jan. 21, 1958 M. DEPENBROCK 2,820,942
STATIC FREQUENCY CONVERTER
Filed Jan. 22, 1957 3 Sheets-Sheet 1

INVENTOR
Manfred Depenbrock
BY Pierce, Scheffler & Parker
ATTORNEYS

Jan. 21, 1958 M. DEPENBROCK 2,820,942
STATIC FREQUENCY CONVERTER
Filed Jan. 22, 1957 3 Sheets-Sheet 2

INVENTOR
Manfred Depenbrock
BY Pierce, Scheffler & Parker
ATTORNEYS

Jan. 21, 1958  M. DEPENBROCK  2,820,942
STATIC FREQUENCY CONVERTER
Filed Jan. 22, 1957  3 Sheets-Sheet 3
Fig. 9.
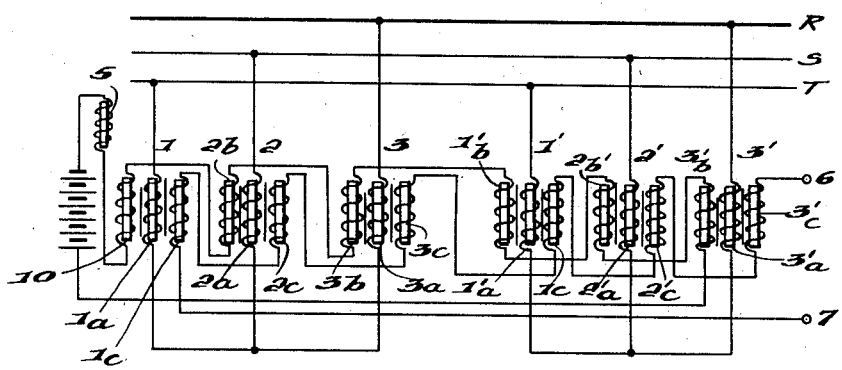
Fig. 10.
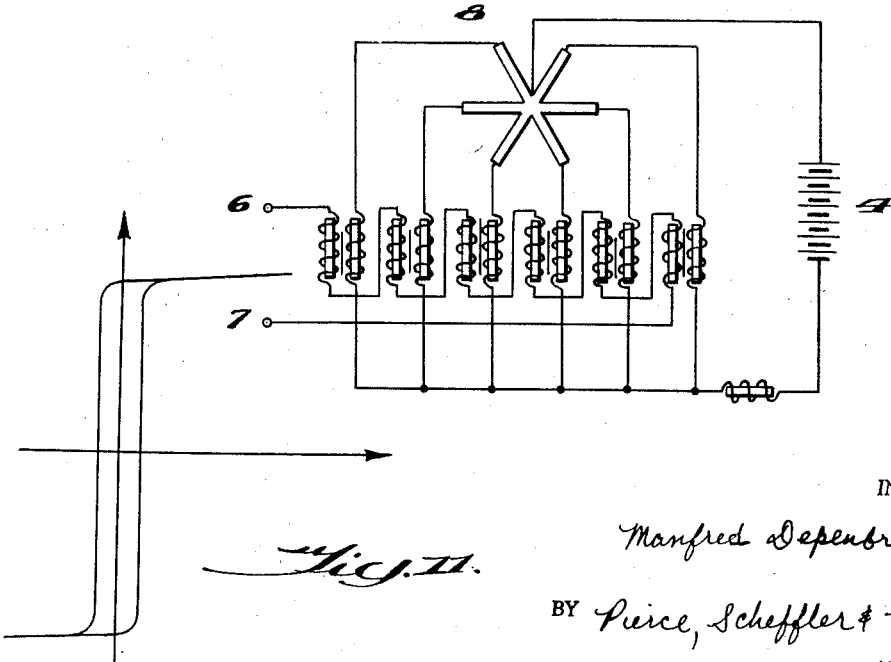
Fig. 11.
INVENTOR
Manfred Depenbrock
BY Pierce, Scheffler & Parker
ATTORNEYS United States Patent Office 2,820,942
Patented Jan. 21, 1958

2,820,942

STATIC FREQUENCY CONVERTER

Manfred Depenbrock, Mannheim-Almenhof, Germany, assignor to Brown, Boveri & Cie, Aktiengesellschaft, Mannheim, Germany, a joint-stock company Application January 22, 1957, Serial No. 635,281

Claims priority, application Germany February 7, 1956

5 Claims. (Cl. 321—68)

This invention relates generally to static frequency converters, and more particularly to static frequency converters for converting power of an $n$-phase alternating current system into single-phase alternating current of $n$-fold frequency.

In electrical apparatus regulating and controlling techniques, and particularly in the application of devices having electron tubes, alternating voltages or currents having special characteristics with regard to time are frequently required. It is often desired that these voltages and currents be of saw-tooth or square waveforms with respect to time and have a frequency which is a multiple of the normal frequency of the A.-C. current. It is the obect of my invention to provide a simple, efficient static frequency converter for this purpose.

Frequency converters for converting an $n$-phase alternating current into a single-phase alternating current of $n$-fold frequency are well known in the art. Such converters have impedance coils associated with each phase and are so connected with each other and with the $n$-phase alternating current system, as for example by star connections, that a voltage can be taken from the arrangement which is produced by the addition of the individual phase voltages. The impedance coils have closed iron cores polarized by direct current so adjusted that the duration of the positive wave portion of each phase, caused by the polarization, was $1/n$ of the entire duration of the period. By the addition of the $n$-voltages a summation voltage of $n$-fold frequency and of approximately sinusoidal nature was obtained.

A disadvantage of this known arrangement is that the D.-C. polarization must be adjusted accurately and maintained constant. Similarly, such arrangements may be only slightly loaded with the result that the materials may be utilized only to a small extent of available output power.

The instant invention is based on the finding that, if the D.-C. polarization of such an arrangement be increased to a multiple of the value required to obtain a sinusoidal voltage course, the loading capacity can be greatly increased, so that a good utilization of the material is achieved and the above-mentioned frequently required special waveforms are obtained. Particularly favorable are the results if known types of soft magnetic materials having sharply broken magnetization characteristics are used for the cores of the impedance coil and transformers respectively.

The invention utilizes this finding and concerns a static frequency converter fed by an $n$-phase alternating current system and used for the production of a single-phase alternating current of $n$-fold frequency, this converter consisting of single-phase transformers with D.-C. polarized cores, connected on the primary side in a star circuit, but where the polarizing direct current circulation is a multiple of that value which is required for complete magnetic saturation of the transformer cores of soft magnetic material having sharply broken magnetization characteristics.

Other objects and advantages of my invention will become more apparent from a study of the following specification when considered in conjunction with the accompanying drawings, in which:

Figs. 7, 8 and 9 are schematic diagrams of circuitry embodiments which produce the rectangular waveform of Fig. 6;

Fig. 10 is an embodiment of my invention utilized for the production of a saw-tooth voltage of six-fold frequency.

Fig. 11 shows the sharply broken magnetization characteristic of a soft magnetic material. Such material may be used for the cores of the impedance coil and the transformers. The magnetic intensities in ampere-turns are plotted as abscissas, and the corresponding flux as ordinates.

Figure 1:
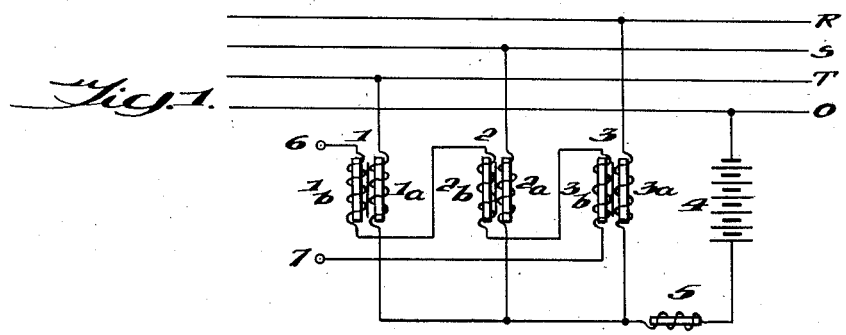
Figs. 1–3 are schematic diagrams of three embodiments of my invention.
Figure 2:
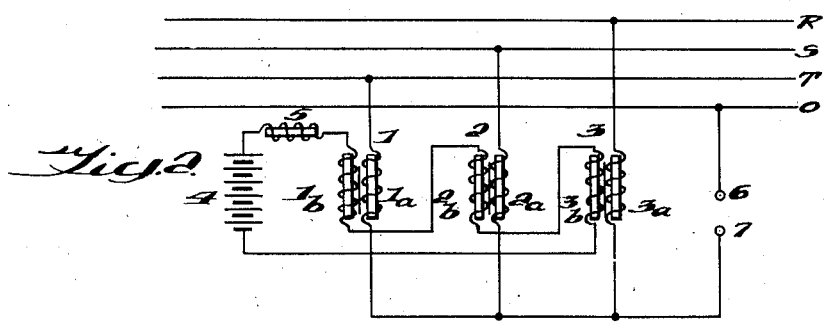
Figure 3:
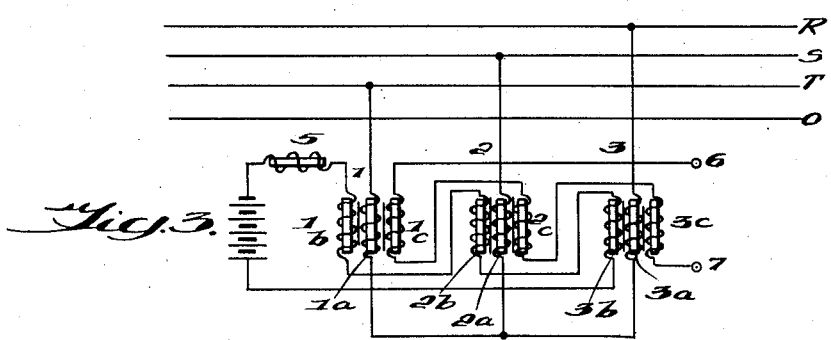

Referring now to Figs. 1–3, a three-phase system has been assumed to be the source of the $n$-phase A.-C. power. To the three-phase conductors R, S, T of the three-phase system are connected the transformers 1, 2 and 3 having cores of a magnetic material with a sharply broken magnetization characteristic. The primary windings 1a, 2a, 3a of the transformers 1, 2, 3 are connected in star arrangement.

As shown in Fig. 1, the positive terminal of the D.-C. source 4 is connected through a series-connected impedance coil 5 to the star connection of the primary windings and the negative terminal is connected to the neutral conductor 0 of the three-phase system. The impedance coil 5 serves to keep the polarizing direct current constant, regardless of the alternating voltage occurring in the polarizing circuit.

The secondary windings 1b, 2b, 3b of the transformers are connected in series to the terminals 6 and 7, where an alternating voltage of $n$-fold frequency appears and from which a corresponding current can be tapped.

Fig. 2 shows a reversal of the arrangement according to Fig. 1. The secondary windings 1b, 2b, 3b, connected in series, carry the polarizing current, while the terminals 6 and 7, used for tapping an alternating current of $n$-fold frequency, are connected with the star point of the transformers on the primary side, and on the other hand with the neutral conductor 0 of the three-phase current system.

In the arrangement according to Fig. 3 the secondary windings 1b, 2b, 3b, are used for the polarization and the tertiary windings 1c, 2c, 3c for tapping the alternating current of $n$-fold frequency.

The method of operation of the three arrangements is approximately the same and takes place as follows:

Due to the polarization of the transformer cores, which is great compared to the circulation required for the magnetic saturation of the cores, one of the three cores is alternately saturated magnetically. If we assume a rectangular magnetization characteristic and disregard the voltage drop in the windings, the voltage at the windings of the core which is just saturated is always zero. The star point has thus the potential of that phase in which the respective saturated transformer core lies. For reasons of symmetry the saturation period in each transformer is $1/n$ of a period, in the present case thus 120 deg. el. As can be deduced theoretically, and verified by experiments, this saturation period is symmetrical in time to the zero passage of the voltage between the respective phase conductor and the neutral conductor.

Figure 4:
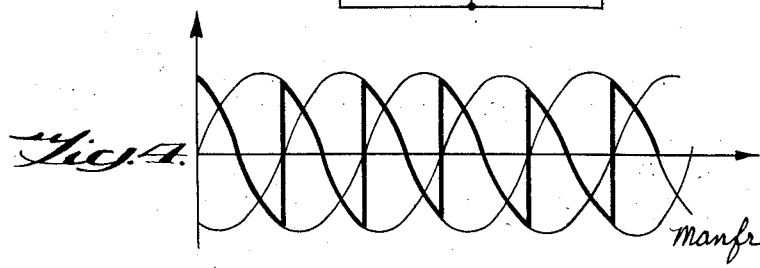
Figs. 4 and 5 show saw-tooth waveforms produced by the circuitry of Figs. 1–3.
Figure 5:
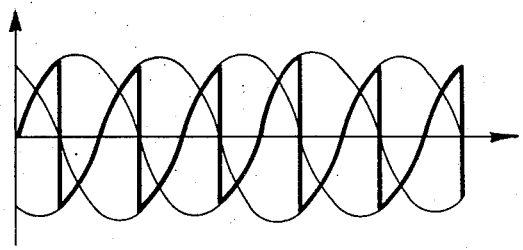

Since the voltage, as already mentioned, has always the same course during a third period, compared to the neutral conductor of the three-phase system, as the respective phase conductor of the three phase system, we obtain between the terminals 6 and 7 of an arrangement according to Fig. 2, a voltage waveform with respect to time as is represented in Figs. 4 or 5 by the solid lines.

A voltage with the same waveform is also produced between the terminals 6 and 7 of the arrangements according to Figs. 1 and 3.

Nothing is changed principally in the waveform of the voltage between the terminals 6 and 7, apart from a voltage drop caused by the resistance and the leakage inductance of the windings, if a current is tapped from the terminals of this device, provided the current remains below a limit which is given by the polarizing direct current circulation.

By changing the direct current circulation it is possible to adapt the current loading capacity of the arrangement to the respective conditions. Favorable conditions for the operation of the frequency converter according to the invention with a given load can be achieved if the transformers are so dimensioned that the required power can be given off with a polarizing direct current circulation which is about ten times higher than the circulation which is necessary to obtain the magnetic saturation of the transformer cores.

If it is desired to produce a rectangular rather than a saw-tooth waveform of the alternating voltages and currents respectively of $n$-fold frequency, this can be effected, according to another feature of the invention, in that two groups of $n$ transformers, star-connected with $n$ phases of the feeding system, form each a partial frequency converter of the above-described type, the transformer cores of the partial frequency converters being polarized in the opposite direction, and that the voltages of the two partial frequency converters used for the generation of alternating currents of $n$-fold frequency are superposed in the sense of a series connection.

Figure 6:
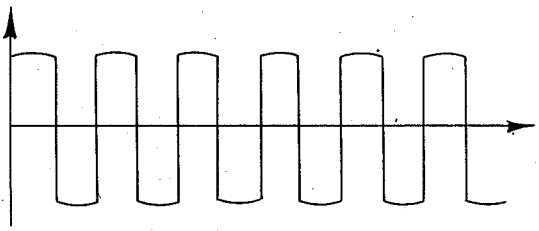
Fig. 6 shows the rectangular waveform which may be produced by the combination of the waveforms of Figs. 4 and 5.

Due to the oppositely directed polarization of the transformer cores, the two partial frequency converters yield saw-toothed voltages where the oblique curve parts are inclined in opposite direction, as it can be seen in Figs. 4 and 5. By adding these two voltages, we obtain then an approximately rectangular total voltage according to Fig. 6.

Figure 7:
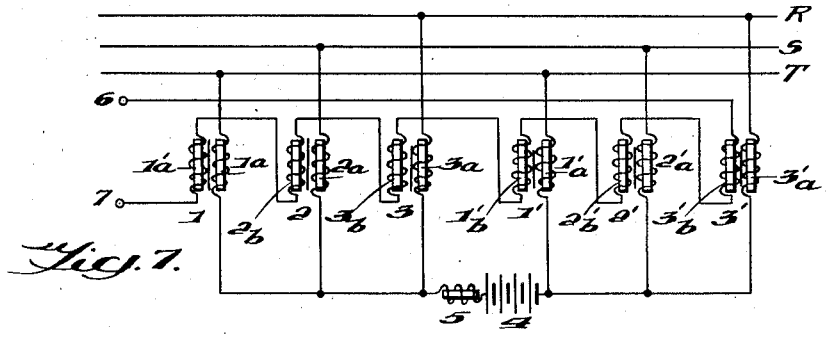
Figure 8:
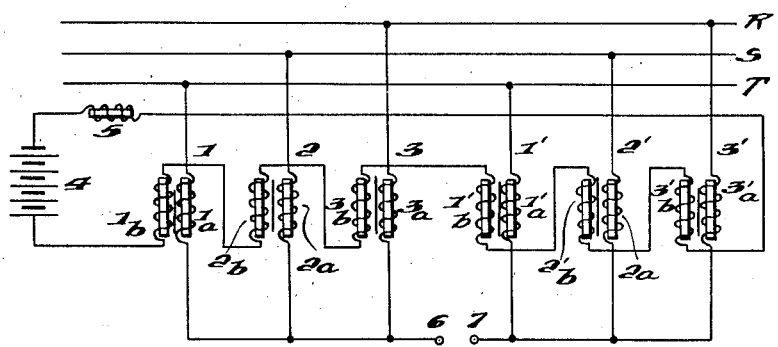

Wiring arrangements with which such voltages and currents respectively can be obtained, are represented in Figs. 7, 8 and 9. The referenc marks are the same as in Figs. 1–3, apart from the fact that the corresponding parts of the second partial frequency converter are designated with 1′, 2′, 3′, etc.

The principles of my invention are not limited to the generation of a voltage of three-fold frequency from a three-phase current system, since the invention may also be used in alternating current systems with other phase numbers. Fig. 10 shows, for example, a frequency converter for the generation of a saw-toothed voltage of six-fold frequency, where the three-phase system R, S, T is first converted in known manner by means of a transformer 8, which is six-phase on the secondary side, into a six-phase alternating current system. The generation of a saw-toothed voltage of six-fold frequency from this six-phase system takes place then in a similar manner as in the foregoing examples.

Other variations of the arrangements are possible. As it can be seen particularly from Fig. 2 and the respective specification, the saw-toothed voltage of three-fold frequency appears also at the terminals of the impedance coil 5. If we provide this impedance coil with a secondary winding, a corresponding current of three-fold frequency can also be tapped from this coil.

While in accordance with the provisions of the statutes I have illustrated and described the best form of embodiment of my invention known to me, it will be apparent to those skilled in the art that changes may be made in the form of the circuitry described without departing from the spirit of my invention as set forth in the appended claims.

I claim:

1. A static frequency converter for converting a source of $n$-phase alternating current into a single-phase alternating current of $n$-fold frequency comprising single-phase transformers with D.-C. polarized cores associated with each phase, said transformers having their primary windings connected in star arrangement and the cores of said transformers consisting of soft magnetic material having a sharply broken magnetization characteristic, and direct-current means for supplying a polarizing current to said cores of a value which is a multiple of that current required to magnetically saturate said transformer cores.

2. A static frequency converter as defined in claim 1, wherein the direct-current means for polarizing the transformer cores is connected between the star point of the transformer primary windings and the neutral conductor of the alternating-current source, and the secondary windings of the transformer are connected in series.

3. A static frequency converter as defined in claim 1, wherein the secondary windings of said transformers are connected in series with said direct-current polarizing means and the A.-C. converted current of $n$-fold frequency is taken between the star point of the transformer primary windings and the neutral conductor of the alternating-current source.

4. A static frequency converter as defined in claim 1, wherein the secondary windings of said transformer are connected in series with the direct current polarizing means, and said transformer is provided with tertiary windings for producing the alternating converted current of $n$-fold frequency.

5. A static frequency converter as defined in claim 1 having two groups of transformers, the transformers of each group having primary windings connected in star arrangement and connected to the alternating current source to constitute partial frequency converters, the transformer cores of the partial frequency converters being polarized in opposite directions, the converted voltages of the partial frequency converters being serially connected in superposed summation relation.

References Cited in the file of this patent

UNITED STATES PATENTS

| | | |
|---|---|---|
| 1,215,820 | Kujiral | Feb. 13, 1917 |
| 2,666,178 | Kramer | Jan. 12, 1954 |